United States Patent
Kadambande et al.

(10) Patent No.: US 6,627,700 B1
(45) Date of Patent: Sep. 30, 2003

(54) AQUEOUS DISPERSIONS OF ACRYLATE MODIFIED ALKYD RESINS AND USE THEREOF

(75) Inventors: Vijay Kadambande, Münster (DE); Heinz-Peter Rink, Münster (DE)

(73) Assignee: BASF Coatings AG, Munster (DE)

(*) Notice: Subject to any disclaimer, the term of this patent is extended or adjusted under 35 U.S.C. 154(b) by 0 days.

(21) Appl. No.: 10/129,383

(22) PCT Filed: Nov. 22, 2000

(86) PCT No.: PCT/EP00/11616

§ 371 (c)(1),
(2), (4) Date: Aug. 21, 2002

(87) PCT Pub. No.: WO01/40336

PCT Pub. Date: Jun. 7, 2001

(30) Foreign Application Priority Data

Nov. 27, 1999 (DE) .......................... 199 57 161

(51) Int. Cl.[7] .............................. C08G 63/49
(52) U.S. Cl. .................... 525/7.3; 524/601; 524/604; 524/608; 523/522
(58) Field of Search .................... 525/7.3; 524/601, 524/604, 608; 523/522

(56) References Cited

U.S. PATENT DOCUMENTS

| | | | |
|---|---|---|---|
| 3,470,126 A | 9/1969 | Sekmakas | 260/29.7 |
| 4,133,786 A * | 1/1979 | Harris et al. | 523/501 |
| 5,691,425 A | 11/1997 | Klein et al. | 525/455 |
| 6,043,301 A | 3/2000 | Hille et al. | 523/501 |
| 6,162,506 A | 12/2000 | Lettmann et al. | 427/407.1 |
| 6,166,150 A | 12/2000 | Wilke et al. | 525/453 |

FOREIGN PATENT DOCUMENTS

| | | | |
|---|---|---|---|
| CA | 2073115 | 1/2002 | C09D/175/14 |
| DE | 19645761 | 5/1998 | C08F/283/00 |
| WO | WO95/33011 | 12/1995 | C09D/151/08 |

OTHER PUBLICATIONS

English Abstract for DE 19645761.

* cited by examiner

Primary Examiner—James J. Seidleck
Assistant Examiner—Olga Asinovsky

(57) ABSTRACT

Aqueous dispersion of an acrylate-modified alkyd resin, preparable in the presence of at least one water-miscible diol by (1) dispersing in water at least one alkyd resin containing pendant and/or terminal allyloxy groups, (2) graft copolymerizing a mixture of methacrylic acid and at least one further, carboxyl-free olefinically unsaturated monomer in dispersion 1, and (3) once or n times graft copolymerising (3.1) at least one olefinically unsaturated monomer which is free from acid groups and/or (3.2) at least one mixture of at least one olefinically unsaturated monomer which contains acid groups and at least one olefinically unsaturated monomer which is free from acid groups, in dispersion 2 or 2 to n−1, with the proviso that in step (3) or (n) of the process, acid groups are incorporated in a total amount to not more than 90 mol % of the amount of acid groups incorporated in step (2) of the process.

11 Claims, No Drawings

AQUEOUS DISPERSIONS OF ACRYLATE MODIFIED ALKYD RESINS AND USE THEREOF

This application is a National Phase Application of PCT/EP00/11616 filed on Nov. 22, 2000.

The present invention relates to novel dispersions of acrylate-modified alkyd resins. The present invention also relates to the use of the novel dispersions as novel air-drying or thermally curable coating materials, adhesives, and sealing compounds, and to the use for preparing them. The present invention additionally relates to novel coatings, adhesive films, and seals on and in primed or unprimed substrates, producible from the novel coating materials, adhesives, and sealing compounds. The present invention relates not least to the novel primed and unprimed substrates which comprise the coatings, adhesives, and seals.

Alkyd resins and modified alkyd resins, owing to their advantageous performance properties, constitute the binder base in about a third of all coating materials worldwide (in this respect see all also Römpp Lexikon Lacke und Druckfarben, Georg Thieme Verlag, Stuttgart, New York, "alkyd resins", pages 20 to 22). It is therefore very important on ecological grounds to provide alkyd resins and especially modified alkyd resins, which can be dispersed or are soluble in water without detriment to their advantageous performance properties and which are hence able to form the basis for aqueous coating materials, adhesives, and sealing compounds.

Alkyd resins generally offer the advantage that they require no cosolvents for forming a film. A disadvantage is that they need a relatively long period of time for drying. Dispersions of acrylate copolymers, although drying more quickly, do need cosolvents for effective film formation. Acrylate-modified alkyd resins combine the two advantages of the individual components without the need to tolerate their disadvantages. It is therefore very important economically and technically to carry out further development of these alkyd resins in particular in the sense outlined above.

International patent application WO 98/13404 discloses the preparation of an aqueous dispersion of an acrylate-modified alkyd resin for which first of all a polyurethane-alkyd resin is prepared in methyl ethyl ketone. After the polyurethane-alkyd resin has been neutralized it is dispersed in water, after which the methyl ethyl ketone is removed, except for a residual fraction, by azeotropic distillation. Thereafter, at least one olefinically unsaturated monomer substantially having no reactive functional groups other than the double bond is (co)polymerized in said dispersion. These aqueous dispersions give high-quality, low-yellowing, weathering-stable, scratch-resistant, and high-gloss coatings. Nevertheless, they have the disadvantage that they can be prepared only on the basis of the comparatively expensive polyurethanes. Moreover, the possibility of varying the profile of properties of the dispersions further by the incorporation of reactive functional groups is lost. Not least, the azeotropic distillation of the relatively large amounts of solvents presents safety and economic problems.

It is an object of the present invention to provide novel aqueous dispersions of acrylate-modified alkyd resins which no longer have the disadvantages of the prior art but for whose preparation instead it is only necessary to use such small amounts of solvents that it is no longer necessary to remove them from the dispersions. Moreover, the novel aqueous dispersions ought also to be able to be prepared on the basis of polyurethane-free alkyd resins. In the preparation of the novel aqueous dispersions, furthermore, it ought to be possible to modify the alkyd resins with olefinically unsaturated monomers which do contain reactive functional groups in addition to the olefinically unsaturated double bond. Over and above this, the novel aqueous dispersions ought to give coating materials, adhesives, and sealing compounds which can be employed broadly and which give coatings, adhesive films, and seals that are of particularly high quality and long service life.

Found accordingly has been the novel aqueous dispersion of an acrylate-modified alkyd resin which is preparable in the presence of at least one water-miscible diol by (1) dispersing in water at least one alkyd resin containing based on its total amount from 0.1 to 10% by weight of pendant and/or terminal allyloxy groups to give the dispersion 1, (2) subjecting a mixture of methacrylic acid and at least one further, carboxyl-free olefinically unsaturated monomer to graft copolymerization in the dispersion 1 to give the dispersion 2, and (3) once or n times subjecting
  (3.1) at least one olefinically unsaturated monomer which is free from acid groups and/or
  (3.2) at least one mixture of at least one olefinically unsaturated monomer which contains acid groups and at least one olefinically unsaturated monomer which is free from acid groups to graft copolymerization in the dispersion 2 or 2 to n−1 resulting from the respective preceding step (2) or (2) to (n−1) of the process, with the proviso that in step (3) of the process or its repetitions (3) to (n) acid groups are incorporated in an amount which corresponds in total to not more than 90 mol % of the amount of acid groups incorporated in step (2) of the process.

The novel aqueous dispersion of an acrylate-modified alkyd resin is referred to below as dispersion of the invention, further subject matter of the invention will emerge from the description.

In the light of the prior art it was surprising and unforeseeable for the skilled worker that the dispersions of the invention, even with particle sizes of up to 1 μm, were stable and free from gel specks, despite being substantially free from organic solvents. It was further surprising that for their preparation it was possible to do largely without organic solvents requiring removal from the dispersion afterward. Another surprise was the extremely broad applicability of the dispersion of the invention, which goes well beyond the technological fields in which acrylate-modified alkyd resins and their dispersions are commonly used.

The dispersion of the invention has a high solids content. Said content is preferably from 10 to 80%, more preferably from 15 to 70%, with particular preference from 20 to 65%, with very particular preference from 30 to 60%, and in particular from 40 to 55% by weight, based on the total amount of the dispersion of the invention.

The essential constituent of the dispersion of the invention is the acrylate-modified alkyd resin. Its molecular weight may vary very widely and is guided primarily by the respective intended use of the dispersion of the invention. Its number-average molecular weight is preferably from 2 000 to 100 000, in particular from 2 000 to 50 000. It is also possible for the acid number and the hydroxyl number to vary widely. The acid number is preferably from 20 to 70, in particular from 30 to 40, mg KOH/g and the hydroxyl number is preferably from 10 to 150, in particular from 30 to 90, mg KOH/g. The glass transition temperature may likewise vary very widely. In accordance with the invention, however, it is of advantage if it lies above 0° C. It is preferably from 1 to 80° C., in particular from 2 to 60° C.

The preparation of the acrylate-modified alkyd resin for inventive use starts from an alkyd resin which preferably has a number-average molecular weight of from 1 000 to 3 000 and in particular from 1 000 to 2 000. The acid number is preferably from 15 to 40, in particular from 30 to 35, mg KOH/g. The hydroxyl number is preferably from 30 to 150, in particular from 40 to 60, mg KOH/g. The iodine number according to DIN 53241-1 is from 0 to 200 g, in particular from 50 to 200 g, of iodine/100 g. The glass transition temperature of the alkyd resin is preferably below 0° C., in particular from −70 to −10° C. The oil content of the alkyd resins may likewise vary very widely and is guided in particular by the requirements of the respective intended use. It is preferred to employ a fatty acid content or an oil content of from 20 to 80% by weight and in particular from 30 to 70% by weight (calculated as triglyceride; oil length), based in each case on the alkyd resin.

In accordance with the invention, the pendant and/or terminal allyloxy group are present in the alkyd resin in an amount, based in each case on the alkyd resin, of from 0.1 to 10%, preferably from 0.2 to 9%, more preferably from 0.3 to 8%, with particular preference from 0.4 to 7%, with very particular preference from 0.5 to 6%, and in particular from 0.6 to 5% by weight. The oxygen atom of the allyloxy group may be part of a urethane group, an ester group or an ether group which connects the allyl radical to the main chain of the alkyd resin. The oxygen atom is preferably part of an ether group; in other words, allyl ether groups are used with preference in accordance with the invention.

There are no special features to the method of preparing the alkyd resins, which instead are prepared in accordance with the customary and known methods of preparing alkyd resins from saturated and unsaturated, linear and branched, short-chain and long-chain alkylmonocarboxylic acids (oils, fatty acids), aromatic, optionally alkyl-substituted monocarboxylic acids, aliphatic and aromatic dicarboxylic acids, and—where they exist—their anhydrides, hydroxycarboxylic acids, diols and higher polyfunctional polyols, and compounds which introduce allyloxy groups. It is also possible to use higher polyfunctional aromatic carboxylic acids such as pyromellitic acid, hemimellitic acid and/or mellitic acid and/or their anhydrides, adducts of customary and known polyisocyanates with compounds containing isocyanate-reactive functional groups such as hydroxyl groups and/or amino groups, abietic acid, rosin, epoxides, and/or epoxidized fatty acids as additional starting products.

The stirred tanks commonly used for condensation reactions are suitable for the synthesis.

Examples of suitable alkylmonocarboxylic acids are present, for example, in natural oils such as linseed oil, soybean oil, tall oil, safflower oil, cotton seed oil, castor oil, sunflower oil, groundnut oil, wood oil or ricinene oil. The fatty acids obtained from these are linseed oil, soybean oil, tall oil, safflower oil, cotton seed oil, castor oil, sunflower oil, groundnut oil, wood oil or ricinene oil fatty acid. Also suitable are isononanoic acid, 2-ethylhexanoic acid, coconut fatty acid, stearic acid and/or Juvandole fatty acid.

Examples of suitable aromatic monocarboxylic acids are benzoic acid or p-tert-butylbenzoic acid.

Examples of suitable dicarboxylic acids are phthalic acid, isophthalic acid, terephthalic acid, phthalic, isophthalic or terephthalic monosulfonate, halophthalic acids such as tetrachloro- or tetrabromophthalic acid, oxalic acid, malonic acid, succinic acid, glutaric acid, adipic acid, pimelic acid, suberic acid, azelaic acid, sebacic acid, undecanedicarboxylic acid, dodecanedicarboxylic acid, maleic acid, fumaric acid, itaconic acid, 1,2-cyclobutanedicarboxylic acid, 1,3 cyclobutanedicarboxylic acid, 1,2-cyclopentane-dicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexa-hydrophthalic acid, tricyclodecanedicarboxylic acid, tetrahydrophthalic acid or 4-methyltetrahydrophthalic acid. The cycloaliphatic dicarboxylic acids can be used both in their cis form and in their trans form and also as a mixture of both forms.

Examples of suitable hydroxycarboxylic acids are 2-, 3-, 4-hydroxybenzoic acid, ricinoleic acid, dihydroxypropionic acid, dihydroxysuccinic acid, dihydroxybenzoic acid, 2,2-dimethylolacetic acid, 2,2 -dimethylolpropionic acid, 2,2-dimethylolbutyric acid, and 2,2-dimenthylolpentanoic acid.

Examples of suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, pentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2 -ethylpropane-1,3-diol, 2-butyl-2-methylpropane-1,3 -diol, 2-phenyl-2-methylpropane-1,3-diol, 2-propyl-2 -ethylpropane-1,3-diol, 2-di-tert-butylpropane-1,3-diol, 2-butyl-2-propylpropane-1, 3-diol, 1-dihydroxymethylbicyclo[2.2.1]heptane, 2,2-diethylpropane-1,3-diol, 2,2-dipropylpropane-1,3-diol, 2-cyclohexyl-2-methylpropane-1,3-diol, 2,5-dimethylhexane-2,5-diol, 2,5 diethylhexane-2,5-diol, 2-ethyl-5-methylhexane-2,5 -diol, 2,4-dimethylpentane-2,4-diol, 2,3-dimethylbutane-2,3-diol, 1,4-(2'-hydroxypropyl) benzene or 1,3-(2'-hydroxypropyl)benzene. In addition to or instead of these diols it is also possible to use diols of higher molecular mass such as polyester diols or polyether diols. It is preferred to employ the low molecular mass diols.

Examples of suitable polyols are triols such as trimethylolethane, trimethylolpropane or glycerol, especially trimethylolpropane, tetrols such as pentaerythritol or homopentaerythritol or sugar alcohols such as threitol or erythritol, or pentitols such as arabitol, adonitol or xylitol or hexitols such as sorbitol, mannitol or dulcitol.

Examples of suitable compounds for introducing pendant and/or terminal allyloxy groups are allyl alcohol, 2-hydroxyethyl allyl ether, 3-hydroxypropyl allyl ether, trimethylolpropane monoallyl or diallyl ether, glycerol monoallyl or diallyl ether, pentaerythritol monoallyl, diallyl or triallyl ether, mannitol monoallyl, diallyl, triallyl or tetraallyl ether, allyl esters of dihydroxypropionic, dihydroxysuccinic, dihydroxybenzoic, 2,2-dimethylolacetic, 2,2-dimethylolpropionic, 2,2-dimethylolbutyric or 2,2-dimethylolpentanoic acid, or allyl urethane, of which trimethylolpropane monoallyl ether is of advantage and is therefore used preferably in accordance with the invention.

The above-described starting products and their amounts are selected so as to give alkyd resins with the profile of properties described above. The skilled worker is therefore able to determine the suitable starting products and proportions in each case with ease on the basis of his or her general knowledge in the art, where appropriate with the assistance of simple preliminary rangefinding tests.

Prior to their further reaction, the alkyd resins containing allyloxy groups are diluted with at least one water-soluble or -dispersible diol, preferably ethylene glycol, propylene glycol and/or butylene glycol, particularly propylene glycol. It is preferred to employ only amounts such that the resulting mixture is liquid. Preference is given to using from 2 to 20%, in particular from 5 to 15% by weight of diol, based on the mixture.

In accordance with the invention, the alkyd resins containing allyloxy groups are dispersed in an aqueous medium to give the dispersion 1.

The aqueous medium contains substantially water. It preferably further includes at least one neutralizing agent, with which the acid groups present in the alkyd resin are partly or completely neutralized. Examples of suitable neutralizing agents for the potentially anionic groups of the alkyd resin are alkali metal and alkaline earth metal hydroxides, oxides, carbonates or hydrogen carbonates, and also ammonia and amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine.

The aqueous medium may further comprise minor amounts of organic solvents and/or other dissolved solid, liquid or gaseous organic and/or inorganic substances of low and/or high molecular mass. In the context of the present invention, the term "minor amount" means an amount which does not rob the aqueous medium of its aqueous nature. Examples of suitable organic solvents are the above-described water-miscible diols, which can be supplied to the dispersion 1 directly and/or by way of the monomer feeds and/or initiator feeds of the graft copolymerization stages (2) to (n) that are described below.

It is possible not least for the aqueous medium to include at least one of the customary coatings additives described below. Suitable additives are all those which do not partly or fully inhibit the multistage graft copolymerization of the olefinically unsaturated monomers.

Alternatively, the aqueous medium may comprise straight water.

In accordance with the invention, in a stage (2), methacrylic acid and at least one further olefinically unsaturated monomer are subjected to graft copolymerization in the dispersion 1. Besides the olefinically unsaturated double bonds, the further olefinically unsaturated monomers may contain other reactive functional groups—with the exception of carboxyl groups, examples being isocyanate-reactive, carbamate-reactive, N-methylol- or N-methylol ether-reactive or alkoxycarbonylamino-reactive groups. What is important here is that, under the given reaction conditions and the subsequent storage of the dispersions of the invention, these reactive functional groups do not undergo any reactions with the carboxyl groups of the methacrylic acid or with other reactive functional groups that may be present. One example of reactive functional groups which meet these requirements is the hydroxyl group.

Examples of suitable further monomers (a) which can be used for preparing the acrylate-modified alkyd resins of the invention and the dispersions of the invention are:
Monomers (a1):
Hydroxyalkyl esters of acrylic acid, of methacrylic acid or of another alpha,beta-olefinically unsaturated carboxylic acid which derive from an alkylene glycol which is esterified with the acid or are obtainable by reacting the acid with an alkylene oxide, especially hydroxyalkyl esters of acrylic acid, methacrylic acid, crotonic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis (hydroxymethyl)cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl, or triallyl ether. These higher polyfunctional monomers (a1) are generally used only in minor amounts. In the context of the present invention, minor amounts of higher polyfunctional monomers here are amounts which do not lead to crosslinking or gelling of the polyacrylate resins unless the graft copolymers of the invention are intended to be in the form of crosslinked microgel particles. Accordingly, the fraction of trimethylolpropane diallyl ether can be from 2 to 10% by weight, based on the total weight of the monomers (a1) to (a6) used to prepare the polyacrylate resin.
Monomers (a2):
(Meth)acrylic, crotonic or ethacrylic alkyl or cycloalkyl esters having up to 20 carbon atoms in the lkyl radical, especially methyl, ethyl, propyl, n-butyl, sec-butyl, tert-butyl, hexyl, ethylhexyl, stearyl and lauryl acrylate, methacrylate, crotonate or ethacrylate; cycloaliphatic (meth) acrylic, crotonic or ethacrylic esters, especially cyclohexyl, isobornyl, dicyclopentadienyl, octahydro-4,7-methano-1H-indenemethanol or tert-butylcyclohexyl (meth)acrylate, crotonate or ethacrylate; (meth)acrylic, crotonic or ethacrylic oxaalkyl or oxacycloalkyl esters such as ethyl triglycol (meth)acrylate and methoxyoligoglycol (meth)acrylate having a molecular weight Mn of preferably 550; or other ethoxylated and/or propoxylated, hydroxyl-free (meth) acrylic, crotonic or ethacrylic acid derivatives. These may include in minor amounts higher polyfunctional (meth) acrylic, crotonic or ethacrylic alkyl or cycloalkyl esters such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth) acrylate; or pentaerythritol di-, tri- or tetra(meth)acrylate, and also the analogous ethacrylates or crotonates. In the context of the present invention, minor amounts of higher polyfunctional monomers (a2) here are amounts which do not lead to crosslinking or gelling of the polyacrylate resins, unless the acrylate-modified alkyd resins of the invention are intended to be in the form of crosslinked microgel particles.
Monomers (a3):
Olefinically unsaturated monomer carrying per molecule at least one acid group, with the exception of a carboxyl group, or a mixture of such monomers; examples are olefinically unsaturated sulfonic or phosphonic acids and/or their partial esters, such as ethene-, propene- or butene-sulfonic or -phosphonic acid or alkyl or aryl monoesters of phosphonic acids such as methyl, ethyl or phenyl ethene-, propene- or butenephosphonate. In these monomers the olefinic double bonds are preferably terminal.
Monomers (a4):
Vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or with carbon monoxide and water forms a mixture of carboxylic acids in which the carboxyl groups are seated predominantly on a quaternary carbon atom. Other olefinic starting materials are, for example, propylene trimer, propylene tetramer, and diisobutylene. Alternatively, the vinyl esters may be prepared conventionally from the acids, by reacting the acid with acetylene, for example. Particular preference—owing to their ready availability—is given to using vinyl esters of saturated aliphatic monocarboxylic acids having from 9 to 11 carbon atoms that are branched on the alpha carbon atom.

Monomers (a5):

Reaction product of acrylic acid and/or methacrylic acid with the glycidyl ester of an alpha-branched monocarboxylic acid having from 5 to 18 carbon atoms per molecule. The reaction of the acrylic or methacrylic acid with the glycidyl ester of a carboxylic acid having a tertary alpha carbon atom may take place before, during or after the polymerization reaction. As component (a5) it is preferred to use the reaction product of acrylic and/or methacrylic acid with the glycidyl ester of Versatic® acid. This glycidyl ester is available commercially under the name Cardura® E10. For further details refer to Römpp Lexikon Lacke und Druckfarben, Georg Thieme Verlag, Stuttgart, New York, 1998, pages 605 and 606.

Monomers (a6):

Olefinically unsaturated monomers which are substantially free from acid groups, such as olefins such as ethylene, propylene, but-1-ene, pent-1-ene, hex-1-ene, cyclohexene, cyclopentene, norbornene, butadiene, isoprene, cyclopentadiene and/or dicyclopentadiene;

methylolated (meth)acrylamides such as N-methylol-, N,N-dimethylol-, N-methoxymethyl-, N,N-di(methoxymethyl)-, N-ethoxymethyl- and/or N,N-di(ethoxyethyl)-(meth)acrylamide, which are used in particular when the acrylate-modified alkyd resins of the invention are intended to have self-crosslinking properties (in this regard see Römpp Lexikon Lacke und Druckfarben, Georg Thieme Verlag, Stuttgart, New York, 1998, "curing", pages 274 to 276);

vinylaromatic hydrocarbons, such as styrene, alpha-alkylstyrenes, especially alpha-methylstyrene, arylstyrenes, especially diphenylethylene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are sold under the brand name VeoVa® by Deutsche Shell Chemie (for further details refer to Römpp Lexikon Lacke und Druckfarben, Georg Thieme Verlag, Stuttgart, New York, 1998, page 598 and also pages 605 and 606) and/or the vinyl ester of 2-methyl-2-ethylheptanoic acid; and/or polysiloxane macromonomers having a number-average molecular weight Mn of from 1 000 to 40 000, preferably from 2 000 to 20 000, with particular preference from 2 500 to 10 000, and in particular from 3 000 to 7 000 and containing on average per molecule from 0.5 to 2.5, preferably from 0.5 to 1.5, olefinically unsaturated double bonds, such as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in international patent application WO 92/22615 on page 12 line 18 to page 18 line 10, or acryloyloxy silane-containing vinyl monomers, preparable by reacting hydroxy-functional silanes with epichlorohydrin and subsequently reacting the reaction product with methacrylic acid and/or hydroxyalkyl esters of (meth)acrylic acid.

From these further suitable monomers (a) described by way of example above, the skilled worker is able to select with ease the monomers (a) which are especially suitable for the respective intended use, on the basis of their known physicochemical properties and reactivities. If desired, the skilled worker may for this purpose carry out a few preliminary rangefinding tests. In particular, he or she will ensure when making this selection that the monomers (a) contain no reactive functional groups, particularly (potentially) ionic functional groups, which undergo unwanted interactions with the carboxyl groups of the monomeric or copolymerized methacrylic acid.

Where the acrylate-modified alkyd resins of the invention are intended to be present in the form of crosslinked microgel particles, higher polyfunctional monomers (a), especially the above-described higher polyfunctional monomers (a1) and/or (a2), are employed in amounts which lead to targeted crosslinking of the grafted-on (co)polymers.

In accordance with the invention, particular advantages result if the monomers (a) are selected such that the profile of properties of the grafted-on (co)polymers is determined essentially by the (meth)acrylate monomers (a) described above, with the other monomers (a), advantageously, broadly varying this profile of properties.

Very particular advantages result in accordance with the invention from using mixtures of the monomers (a1), (a2), and (a6), and also, where appropriate (a3).

Viewed in terms of method, the preparation of the acrylate-modified alkyd resins of the invention has no special features but instead takes place in accordance with the customary and known method of free-radical emulsion polymerization in the presence of at least one polymerization initiator, as is described, for example, in patents DE-C-197 22 862, DE-A-196 45 761, EP-A-0 522 419 or EP-A-0 522 420.

In this context the monomers (a) and the methacrylic acid may also be brought into the form of a preemulsion using part of a dispersion 1 and water, said preemulsion then being metered slowly into an initial charge in which the actual emulsion polymerization takes place.

Examples of suitable polymerization initiators are oil-soluble initiators which form free radicals, such as dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl peroxy-2-ethylhexanoate; azodinitriles such as azobisisobutyronitrile; or C-C-cleaving initiators such as benzpinacol silyl ethers. The initiators are used preferably in an amount of from 0.1 to 25% by weight, with particular preference from 0.75 to 10% by weight, based on the total weight of the monomers (a).

In the aqueous emulsions, methacrylic acid and the monomers (a) are then polymerized with the aid of the above-mentioned radical-forming initiators at temperatures from 0 to 95° C. and preferably 40 to 95° C. When operating under superatmospheric pressure, the polymerization may also be conducted at temperatures above 100° C.

In the polymerization, the infeed of initiator may be commenced at a certain time, generally from about 1 to 15 minutes, before the feed of the monomers. Preference is further given to a process wherein the addition of initiator is commenced at the same point in time as the addition of the monomers and is ended some time later—for example, about half an hour—after the addition of the monomers has been ended. The initiator is preferably added in a constant amount per unit time. After the end of the addition of initiator, the reaction mixture is held at polymerization temperature until (generally from 1.5 to 10 hours) all of the monomers used have undergone substantially complete reaction. "Substantially complete reaction" is intended to denote that preferably 100% by weight of the monomers used have been converted but that it is also possible for a small residual monomer content of not more than up to about 0.5% by weight, based on the weight of the reaction mixture, to remain unreacted.

Suitable reactors for the graft copolymerization include the customary and known stirred tanks, stirred tank cascades, tube reactors, loop reactors or Taylor reactors, such as are described, for example, in patents DE-B-1 071 241 or EP-A-0 498 583 or in the article by K. Kataoka in Chemical Engineering Science, Volume 50, No. 9, 1995, pages 1409 to 1416.

In accordance with the invention, it is of particular advantage to add at least one of the above-described water-soluble diols, especially propylene glycol, to the monomer feed and to the initiator feed.

This gives, after step (2) of the process, the dispersion 2.

In process step (3), in accordance with the invention, at least one of the above-described monomers (a) that are free from acid groups is (co)polymerized in dispersion 2, using the methods and apparatus described above.

In another variant of the process of the invention, in step (3) of the process at least one mixture of at least one olefinically unsaturated monomer (a3) containing acid groups and/or at least one olefinically unsaturated monomer (a7) containing carboxyl groups, such as acrylic acid, methacrylic acid, ethacrylic acid, crotonic acid, maleic acid, fumaric acid, itaconic acid, mono(meth)acryloyloxyethyl maleate, mono(meth)acryloyloxyethyl succinate and/or mono(meth)acryloyloxyethyl phthalate; and at least one olefinically unsaturated monomer that is free from acid groups, in particular at least one of the above-described monomers (a) that are free from acid groups, is copolymerized or graft copolymerized in the dispersion 2. Here again, the above-described methods and apparatus are employed.

In accordance with the invention, in this variant of the process of the invention, acid groups must only be incorporated in an amount which corresponds in total to not more than 90 mol %, preferably not more than 80 mol %, more preferably not more than 60 mol %, with particular preference not more than 50 mol %, with very particular preference not more than 40 mol %, and in particular not more than 30 mol % of the amount of acid groups incorporated in the preceding process step (2).

In accordance with the invention, process step (3) results in the dispersion of the invention.

It is the particular advantage of the process of the invention and of the dispersion of the invention that its profile of properties may be varied advantageously by repeating step (3) of the process.

Step (3) of the process may be repeated once here, giving from dispersion 3 in process step (4) a further dispersion of the invention. However, process step (3) may be repeated a number of times, i.e., n times, giving from dispersions 2 to n–1 always dispersions 3 to n of the invention, which are, however, modified in their respective profile of properties as compared with the dispersion produced in the respective preceding process step. In general it is sufficient here to repeat step (3) of the process twice. In special cases it may also be repeated three times or more.

Another particular variant is the result of repeating process step (3) using a mixture of at least one olefinically unsaturated monomer containing acid groups and at least one olefinically unsaturated monomer that is free from acid groups after having used at least one monomer that is free from acid groups in the preceding process step (3). The same is also true conversely; that is, if in repeating process step (3) at least one monomer that is free from acid groups is used with the mixture having been employed in the preceding process step (3).

For the repetitions of process step (3), too, the above-described apparatus and methods are employed. As regards the upper limits on acid groups which can be incorporated by process step (3) and its repetitions, the comments made above apply.

In the acrylate-modified alkyd resins of the invention, the proportion of graft-copolymerized polyacrylate to alkyd resin may vary very widely. The fraction, based on the acrylate-modified alkyd resin of the invention, is preferably from 20 to 80%, more preferably from 30 to 70%, with particular preference from 40 to 60%, and in particular from 45 to 55% by weight.

The acrylate-modified alkyd resins of the invention can be isolated from the dispersions of the invention in which they are obtained and can be passed on for any of a very wide variety of end uses, especially in solventborne, water- and solvent-free pulverulent solid or water- and solvent-free liquid coating materials, adhesives, and sealing compounds.

In accordance with the invention, however, it is of advantage to use the dispersions of the invention as they are for preparing aqueous coating materials, adhesives, and sealing compounds or as aqueous coating materials, adhesives, and sealing compounds which are air-drying, thermally curable or curable both thermally and with actinic radiation. In their use as coating materials they exhibit outstanding film forming properties.

Besides the acrylate-modified alkyd resins of the invention, the aqueous adhesives of the invention may comprise further suitable customary and known constituents in effective amounts. Examples of suitable constituents are the customary coatings additives described below, insofar as they are suitable for the preparation of adhesives.

Besides the acrylate-modified alkyd resins of the invention, the aqueous sealing compounds of the invention may also comprise further suitable customary and known constituents in effective amounts. Examples of suitable constituents are likewise the customary coatings additives described below, insofar as they are suitable for the preparation of sealing compounds.

The dispersions of the invention are suitable in particular for preparing aqueous coating materials, especially aqueous paints. Examples of aqueous paints of the invention are decorating paints, especially "do-it-yourself" decorating paints, surfacers, solid-cover topcoat materials, aqueous basecoat materials, and clearcoat materials.

In the aqueous paints, the acrylate-modified alkyd resins of the invention are present advantageously in an amount of from 1.0 to 90%, preferably from 2.0 to 80%, with particular preference from 3.0 to 70%, with very particular preference from 4.0 to 60%, and in particular from 5.0 to 55% by weight, based in each case on the total weight of the respective aqueous paint.

Furthermore, the aqueous paints may comprise at least one customary coatings additive.

Customary coatings additives which are significant to performance include color and/or effect pigments. The pigments may be composed of organic or inorganic compounds. Owing to this large number of suitable pigments, therefore, the aqueous paints of the invention ensure a universal breadth of use and make it possible to realize a large number of color shades and optical effects. Examples of suitable pigments are disclosed in Römpp Lexikon Lacke und Druckfarben, Georg Thieme Verlag, 1998, pages 176, "Effect pigments"; pages 380 and 381 "Metal oxide-mica pigments" to "Metal pigments"; pages 180 and 181, "Iron blue pigments" to "Black iron oxide"; pages 451 to 453, "Pigments" to "Pigment volume concentration"; page 563, "Thioindigo pigments"; and page 567, "Titanium dioxide pigments".

Further performance-significant, customary coatings additives are crosslinking agents Examples of suitable crosslinking agents are amino resins. Examples of suitable amino resins are customary and known, and numerous products are available commercially.

Examples of highly suitable amino resins are melamine resins, guanamine resins or urea resins. In this context it is possible to use any amino resin which is suitable for transparent topcoat materials or clearcoat materials, or a mixture of such amino resins. For further details refer to R ömpp Lexikon Lacke und Druckfarben, Georg Thieme Verlag, 1998, page 29, "Amino resins", and the text book "Lackadditive" [Additives for Coatings] by Johan Bieleman, Wiley-VCH, Weinheim, New York, 1998, pages 242 ff., or to the book "Paints, Coatings and Solvents", second completely revised edition, Edited by D. Stoye and W. Freitag, Wiley-VCH, Weinheim, New York, 1998, pages 80 ff. Also suitable, furthermore, are the customary and known amino resins some of whose methylol and/or methoxymethyl groups have been defunctionalized by means of carbamate or allophanate groups. Crosslinking agents of this kind are described in patents U.S. Pat. No. 4 710 542 and EP-B-0 245 700 and also in the article by B. Singh and coworkers "Carbamylmethylated Melamines, Novel Crosslinkers for the Coatings Industry" in Advanced Organic Coatings Science and Technology Series, 1991, Volume 13, pages 193 to 207.

Besides these crosslinking agents or instead of them it is also possible for further crosslinking agents to be present. Examples of suitable further crosslinking agents are compounds or resins containing siloxane groups, compounds or resins containing anhydride groups, compounds or resins containing epoxide groups, blocked and/or nonblocked polyisocyanates and tris(alkoxycarbonylamino)triazines such as are described in patents U.S. Pat. No. 4 939 213, U.S. Pat. No. 5 084 541, U.S. Pat. No. 5 288 865 or EP-A-0 604 922.

Depending on the reactivity of the further crosslinking agent, it may be added directly to the coating materials, adhesives, and sealing compounds of the invention to give what is called a one-component system. If, on the other hand, it is a particularly reactive crosslinking agent, such as a polyisocyanate or an epoxide, this is generally not added until shortly before use to the coating materials, adhesives, and sealing compounds of the invention. The result in this case is what is known as a two-component or multicomponent system.

The use of crosslinking agents is omitted if the aqueous paints of the invention are air-drying, i.e. oxidatively drying, or physically drying (cf. in this respect Römpp Lexikon Lacke und Druckfarben, Georg Thieme Verlag, Stuttgart, New York, 1998, "Curing", pages 274 and 275). The same applies accordingly to the aqueous coating materials and sealing compounds.

The use of crosslinking agents is likewise omitted if the acrylate-modified alkyd resins of the invention that are present in the aqueous paints of the invention have self-crosslinking properties. The same applies accordingly to the adhesives and sealing compounds of the invention.

Where the coating materials, adhesives, and sealing compounds of the invention are to be curable not only thermally but also with actinic radiation (dual cure), they comprise customary and known additives which can be activated with actinic radiation. In the context of the present invention, actinic radiation means electromagnetic radiation, especially visible light, UV light or x-rays, or corpuscular radiation, especially electron beams. Particular preference is given to employing UV light. Examples of suitable constituents which can be activated with actinic radiation are (meth)acryloyl-, allyl-, vinyl- or dicyclopentadienyl-functional (meth)acrylate copolymers or polyether acrylates, polyester acrylates, unsaturated polyester acrylates, epoxy acrylates, urethane acrylates, amino acrylates, melamine acrylates, silicone acrylates or the corresponding methacrylates.

The aqueous paint of the invention may further comprise customary and known binders, especially hydroxylcontaining binders, as additives.

The binders may originate from any of a wide variety of classes of oligomer and polymer. Examples of suitable oligomer and polymer classes are random, alternating and/or block, linear and/or branched and/or comb, addition (co)polymers of olefinically unsaturated monomers, or polyaddition resins and/or polycondensation resins. For further details of these terms refer to Römpp Lexikon Lacke und Druckfarben, Georg Thieme Verlag, Stuttgart, New York, 1998, page 457, "Polyaddition" and "Polyaddition resins (Polyadducts)", and also pages 463 and 464, "Polycondensates", "Polycondensation", and "Polycondensation resins". As regards substituents or reactive functional groups that may be present, the comments made above with regard to the monomers (a) apply analogously.

Examples of highly suitable addition (co)polymers are poly(meth)acrylates and partially hydrolyzed polyvinyl esters.

Examples of highly suitable polyaddition resins and/or polycondensation resins are polyesters, alkyd resins, including those described herein, polyurethanes, polylactones, polycarbonates, polyethers, epoxy resinamine adducts, polyureas, polyamides or polyimides.

Further examples of suitable additives are organic and inorganic fillers, thermally curable reactive diluents, siccatives, low-boiling and/or high-boiling organic solvents ("long solvents"), UV absorbers, light stabilizers, free-radical scavengers, thermolabile free-radical initiators, crosslinking catalysts, devolatilizers, slip additives, polymerization inhibitors, defoamers, emulsifiers, wetting agents, adhesion promoters, leveling agents, film forming auxiliaries, rheology control additives or flame retardants. Further examples of suitable coatings additives are described in the text book "Lackadditive" by Johan Bieleman, Wiley-VCH, Weinheim, New York, 1998.

As mentioned above, in the context of the process of the invention these customary coatings additives may already be added to the dispersions 1, provided they do not inhibit or suppress entirely the graft copolymerization.

The preparation of the aqueous coating materials of the invention, especially the aqueous paints, adhesives, and sealing compounds, has no special features but instead takes place in a customary and known manner by mixing of the above-described constituents in suitable mixing equipment such as stirred tanks, dissolvers, stirrer mills or extruders, in accordance with the techniques that are suitable for the preparation of the respective coating materials, adhesives, and sealing compounds.

The adhesives of the invention serve for producing adhesive films of the invention on primed and unprimed substrates.

The sealing compounds of the invention serve for producing seals of the invention on and in primed and unprimed substrates.

The aqueous coating materials of the invention serve for producing single-coat or multicoat clearcoat systems or color and/or effect paint systems on primed and unprimed substrates.

Very particular advantages result in the context of their use for producing pigmented basecoats, especially as part of what is known as the wet-on-wet technique, in which a basecoat material, especially an aqueous basecoat material, is applied to the primed or unprimed substrate and dried but not cured and then a clearcoat material is applied to the basecoat film and the resulting clearcoat film is cured together with the basecoat film, thermally or both thermally and with actinic radiation (dual cure).

Suitable substrates include all surfaces to be coated that are not damaged by curing of the films present thereon using heat or using heat and actinic radiation in combination (dual cure); they include, for example, metals, plastics, wood, ceramic, stone, textile, fiber composites, leather, glass, glass fibers, glass wool, rock wool, mineral-bound building materials and resin-bound building materials, such as plasterboard panels, cement slabs or roofing shingles, and composites of these materials. Accordingly, the coatings, adhesive films or seals of the invention are also suitable for applications outside of automotive OEM finishing and automotive refinish. In these contexts they are suitable particularly for the coating, adhesive bonding and/or sealing of furniture and for industrial application, including coil coating, container coating, and the impregnation or coating of electrical components. In the context of the industrial applications they are suitable for coating, bonding and/or sealing virtually all parts for private or industrial use such as radiators, domestic appliances, small metal parts such as nuts and bolts, hubcaps, wheel rims, packaging or electrical components such as motor windings or transformer windings.

In the case of electrically conductive substrates it is possible to use primers, which are produced in conventional manner from electrocoat materials. Both anodic and cathodic electrocoat materials may be used for this purpose, but especially cathodics.

It is also possible to coat, bond or seal primed or unprimed plastics parts made, for example, from ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728 T1). Unfunctionalized and/or apolar substrate surfaces may be subjected prior to coating in a known manner to a pretreatment, such as with a plasma or by flaming, or may be provided with a hydroprimer.

The application of the adhesives, sealing compounds, and coating materials of the invention may take place by any customary application method, such as spraying, knifecoating, spreading, flowcoating, dipping, impregnating, trickling or rolling, for example. The substrate to be coated may itself be at rest, with the application equipment or unit being moved. Alternatively, the substrate to be coated, especially a coil, may be moved, with the application unit being at rest relative to the substrate or being moved appropriately. Where the adhesives, sealing compounds, and coating materials of the invention include constituents which can be activated with actinic radiation, application is preferably conducted in the absence of light.

Depending on their physical composition, the applied films of the adhesives, sealing compounds, and coating materials of the invention may be cured oxidatively, (air drying), thermally, or both thermally and with actinic radiation.

In the case of oxidative curing, no further measures in terms of apparatus need be taken. If desired, oxidative curing may be assisted by means of higher temperatures.

Following, where appropriate, a certain rest period, which serves for the leveling of the films and/or for the evaporation of volatile constituents, the applied films of the adhesives, sealing compounds, and coating materials of the invention may also be subjected conventionally to thermal curing or to curing thermally and with actinic radiation.

In terms of method the thermal cure has no special features; instead, the customary and known temperatures in the range from room temperature to 200° C., curing times in the range from one minute to three hours, and apparatus such as radiant heaters or forced air ovens are employed.

The actinic radiation cure also has no special features in terms of its method but instead takes place in conventional manner by irradiation with UV lamps and/or electron beam sources, preferably under inert gas.

In the case of the curing of the dual-cured adhesives, sealing compounds, and coating materials of the invention, thermal curing and actinic radiation curing may be used simultaneously or alternately. Where the two curing methods are used alternately, it is possible, for example, to begin with the thermal cure and end with the actinic radiation cure. In other cases it may prove advantageous to begin and to end with the actinic radiation cure. The skilled worker is able to determine the curing method most advantageous for the case in hand on the basis of his or her general art knowledge with the assistance, where appropriate, of simple preliminary tests.

The adhesive films and seals of the invention that are produced from the sealing compounds of the invention have outstanding adhesion and sealability even under extreme climatic conditions and even over long periods of time.

The coatings of the invention that are produced from the coating materials of the invention exhibit excellent leveling and have an outstanding overall appearance. They are stable to weathering, resistant to acid and moisture, and do not yellow even under tropical conditions. They can therefore be used in the interior sector and in the exterior sector.

Accordingly, the primed and unprimed substrates of the invention, especially bodies of automobiles and commercial vehicles, industrial components, including plastics parts, packaging, coils, and electrical components, or furniture that have been coated with at least one coating of the invention, sealed with at least one seal of the invention and/or bonded using at least one adhesive of the invention, are notable for

EXAMPLES

Preparation Example 1

The Preparation of an Alkyd Resin Containing Allyloxy Groups, for Inventive Use 225 parts by weight of coconut fatty acid, 30.5 parts by weight of benzoic acid, 368.5 parts by weight of trimethylolpropane, 63.6 parts by weight of diethylene glycol, 207.5 parts by weight of isophthalic acid, 0.2 parts by weight of tin oxide hydrate, 185 parts by weight of phthalic anhydride, 62.64 parts by weight of trimethylolpropane monoallyl ether and 60 parts by weight of xylenes were weighed out into a stirred tank which is suitable for preparing alkyd resins and is equipped with reflux condenser, water separator and stirrer. Subsequently, the temperature of the mixture was raised to a maximum of 230° C. until an acid number of less than 10 mg KOH/g had been reached. It was subsequently cooled to 160° C. and 96.0 parts by weight of trimellitic anhydride were added to the reaction mixture. The temperature of the reaction mixture was raised to 180° C. until an acid number of from 30 to 35 mg KOH/g had been reached and the viscosity of the reaction mixture (60% in propylene glycol) was from 5.0 to 6.0 dpas. The solids content was 100% by weight. The glass transition temperature of the alkyd resin was −23° C. Its number-average molecular weight was 1762 Dalton; the polydispersity of the molecular weight, Mw/Mn, was 3.0. The alkyd resin was diluted with propylene glycol to give a solids content of 85% by weight.

Example 1

The Preparation of a Dispersion of the Invention 938 parts by weight of water and 300 parts by weight of the 85% alkyd resin of Preparation Example 1 were weighed out into a reaction vessel suitable for polymerization and equipped with stirrer, reflux condenser and two feed vessels, and this initial charge was heated to 80° C. 36.2 parts by weight of dimethylethanolamine were added to the resulting mixture with stirring. After this, the dispersion had a solids content of 20% by weight. Metered into this dispersion at a reaction temperature of 82° C., beginning simultaneously, were on the one hand a mixture of 64.5 parts by weight of styrene, 75.2 parts by weight of hydroxyethyl methacrylate, 56.8 butyl methacrylate and 31.4 parts by weight of methacrylic acid, metered in over the course of two hours, and on the other hand a mixture of 11.5 tert-butyl peroxy-2-ethylhexanoate and 6 parts by weight of propylene glycol, metered in over the course of 2.25 hours. After the end of the feeds, the resultant dispersion was postpolymerized at 82° C. for four hours. Then, at a reaction temperature of 82° C., beginning simultaneously, on the one hand a mixture of 114 parts by weight of styrene, 127 parts by weight of hydroxyethyl methacrylate and 27.5 parts by weight of butyl methacrylate was metered in over the course of three hours and on the other hand a mixture of 19 parts by weight of tert-butyl peroxy-2-ethylhexanoate and 12 parts by weight of propyl glycol was metered in over the course of 3.25 hours. After the end of the feeds, the resulting dispersion was postpolymerized at 82° C. for four hours. The result was a dispersion of the invention having a solids content of 64% by weight. The acid number of the acrylate-modified alkyd resin was 33.5 mg KOH/g. Its hydroxyl number (theoretical) was 123 mg KOH/g. the dispersion was neutralized to 80 mol % with dimethylethanolamine. After this, the dispersion had a pH of 7.3. It could be stored at 40° C. for eight weeks without any formation of a sediment.

For use for preparing aqueous paints of the invention, the dispersion was adjusted with water to a solids content of 40% by weight. The dispersion of the invention was outstandingly suitable for the preparation of two-component systems and one-component systems, especially two-component paints and one-component paints.

Preparation Example 2

The Preparation of an Alkyd Resin Containing Allyloxy Groups, for Use in Accordance with the Invention 193.8 parts by weight of Juvandole fatty acid, 193.8 parts by weight of sunflower fatty acid, 16.9 parts by weight of benzoic acid, 204.1 parts by weight of trimethylolpropane, 14.1 parts by weight of diethylene glycol, 114.9 parts by weight of isophthalic acid, 0.11 parts by weight of tin oxide hydrate, 106.6 parts by weight of hexahydrophthalic acid, 69.4 parts by weight of trimethylolpropane monoallyl ether and 33.2 parts by weight of xylene were weighed out into a stirred tank suitable for preparing alkyd resins and equipped with reflux condenser, water separator and stirrer. The temperature of the mixture was then raised to not more than 230° C. until an acid number of less than 10 mg KOH/g had been reached. It was then cooled to 160° C. and 53.2 parts by weight of trimellitic anhydride were added to the reaction mixture. The temperature of the reaction mixture was raised to 180° C. until an acid number of from 30 to 35 mg KOH/g had been reached and the viscosity of the reaction mixture (60% in propylene glycol) was from 1.0 to 2.0 dPas. The solids content was 100% by weight.

Example 3

The Preparation of a Dispersion of the Invention 410.8 parts by weight of water, 13.8 parts by weight of a commercial emulsifier (Pluriol® A 010 R), 23.1 parts by weight of butyl glycol and 130.9 parts by weight of the alkyd resin according to Preparation Example 2 were weighed out into a reaction vessel suitable for polymerization and equipped with stirrer, reflux condenser and two feed vessels, and this initial charge was heated to 80° C. 19.3 parts by weight of dimethylethanolamine were added to the resulting mixture with stirring. After this, the dispersion had a solids content of 25% by weight. Metered into this dispersion at a reaction temperature of 82° C., beginning simultaneously, were on the one hand a mixture of 58.5 parts by weight of styrene, 44.2 parts by weight of hydroxyethyl methacrylate, 70.1 parts by weight of butyl acrylate and 16.1 parts by weight of methacrylic acid, metered in over the course of three hours, and on the other hand a mixture of 9.83 parts by weight of tert-butyl peroxy-2-ethylhexanoate and 6.1 parts by weight of butylene glycol, metered in over the course of 3.25 hours. After the end of the feeds, the resultant dispersion was postpolymerized at 82° C. for four hours. Then, at a reaction temperature of 82° C., beginning simultaneously, on the one hand a mixture of 33.1 parts by weight of styrene, 22.6 parts by weight of hydroxypropyl acrylate and 54.2 parts by weight of butyl acrylate was metered in over the course of two hours and on the other hand a mixture of 5.9 parts by weight of tert-butyl peroxy-2-ethylhexanoate and 3.1 parts by weight of propylene glycol was metered in over the course of 2.25 hours. After the end of the feeds, the resulting dispersion was postpolymerized at 82° C. for four hours. Thereafter, sufficient water was added to give a dispersion of the invention having a solids content of 48% by weight. The dispersion pH was 7.3. The acrylate-modified alkyd resin of the invention had an acid number of 33.5 mg KOH/g, a theoretical hydroxyl number of 84 mg KOH/g and a glass transition temperature of 6.5° C.

The dispersion of the invention could be stored at 40° C. for eight weeks without any formation of a sediment. For use for preparing aqueous paints of the invention, it was adjusted with water to a solids content of 40% by weight.

Example 4

Preparation of an Aqueous Oxidatively Drying Paint of the Invention

To prepare the aqueous oxidatively dry paint of the invention, first of all a white pigment paste was prepared from 18 parts by weight of the dispersion from Example 3, 3 parts by weight of deionized water, 8.9 parts by weight of a commercial dispersing assistant (Disperse Ayd® W22R from Krahn Chemie) and 60 parts by weight of titanium dioxide (rutile type R-HD2 R from Thioxide). The constituents were mixed and the resulting mixture was adjusted with water to a solids content of 70% by weight and ground on a bead mill until a pigment particle diameter of <15 µm had been reached.

Metered in to 64 parts by weight of the dispersion from Example 3 were 1.8 parts by weight of a siccative mixture consisting of strontium octoate, cobalt octoate and calcium octoate (50% by weight solids content; Siccatol® R938 from Akzo). Then 21 parts by weight of the above-described white pigment paste, 4 parts by weight of butylene glycol, 0.5 parts by weight of a commercial thickener (Rheolate® R278 from Kronos Titan) and 0.4 parts by weight of a commercial defoamer (Byk® R024 from Byk Chemie) were added. Subsequently, 5.0 parts by weight of a commercial wax emulsion (Aquacer® R535 from Byk-Cera Chemie) and 0.3 parts by weight of a Theological assistant (Bentone® R L/T from Kronos Titan) were incorporated. The resultant aqueous paint of the invention was adjusted with water to application viscosity.

The aqueous paint of the invention could be applied to a wide variety of substrates, such as wood, glass, plastics or steel. Following oxidative drying, it gave coatings exhibiting very good leveling, high gloss and high hiding power.

What is claimed is:

1. An aqueous dispersion of an acrylate-modified alkyd resin that is prepared in the presence of at least one water-miscible diol by a process comprising (1) dispersing in water at least one alkyd resin containing, based on its total amount, from 0.1 to 10% by weight of allyloxy groups, wherein the allyoxy groups are at least one of pendant and terminal, to give a dispersion 1, (2) graft copolymerizing a mixture of methacrylic acid and at least one further, carboxyl-free olefinically unsaturated monomer in dispersion 1 to give a dispersion 2, and (3) graft copolymerizing once or n times at least one of:
  (3.1) at least one olefinically unsaturated monomer that is free from acid groups, and
  (3.2) at least one mixture of at least one olefinically unsaturated monomer that contains acid groups and at least one olefinically unsaturated monomer that is free from acid groups, in dispersion 2 or dispersion 2 to n−1 resulting from the respective preceding step (2) or (2) to (n−1) of the process, with the proviso that in step (3) of the process or its repetitions (3) to (n), acid groups are incorporated in an amount that corresponds in total to not more than 90 mol % of the amount of acid groups incorporated in step (2) of the process.

2. The aqueous dispersion of claim 1, wherein the alkyd resin, based on its total amount, contains from 0.1 to 10% by weight of allyl ether groups.

3. The aqueous dispersion of claim 1, wherein the alkyd resin has an oil content, based on its total amount, of from 20 to 70% by weight.

4. The aqueous dispersion of claim 1, wherein the acrylate-modified alkyd resin, based on the resin, contains from 20 to 80% by weight of graft-copolymerized polyacrylate.

5. The aqueous dispersion of claim 1, wherein the graft copolymerization is conducted in the presence of at least one of ethylene glycol, propylene glycol, and butylene glycol.

6. The aqueous dispersion of claim 1, wherein the graft copolymerization is conducted in the presence of at east one coatings additive.

7. A composition comprising at least one aqueous dispersion of claim 1, wherein the composition is one of an air-drying coating material, an adhesive, and a sealing compound.

8. The composition of claim 7, wherein the composition is thermally curable.

9. The composition of claim 8, wherein the composition further comprises at least one crosslinking agent.

10. A substrate comprising of a coating, an adhesive film, and a sealed from the composition of claim 7.

11. A substrate comprising one of a coating, an adhesive film, and a seal formed from the composition of claim 9.

* * * * *